Sept. 7, 1965 H. ZOLLINGER 3,204,757
COMPENSATING DEVICE FOR THE EXPANSION
OF A CONVEYING SYSTEM
Filed Jan. 28, 1964
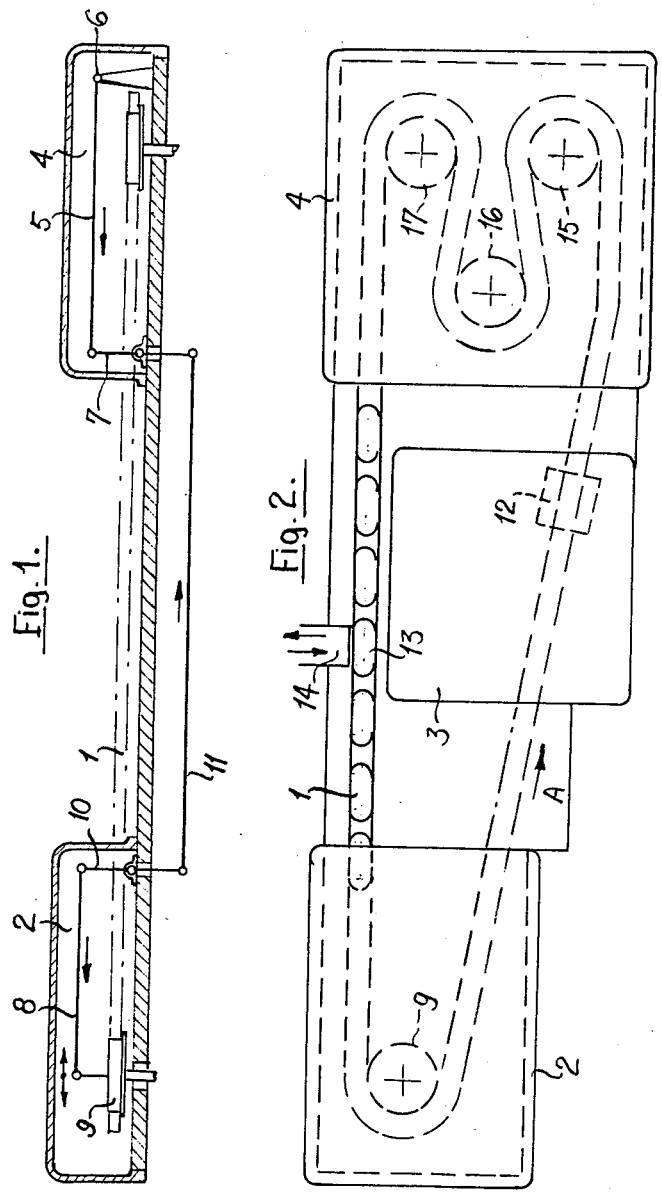

3,204,757
COMPENSATING DEVICE FOR THE EXPANSION OF A CONVEYING SYSTEM
Hans Zollinger, Lausanne, Switzerland, assignor to Autocolora S.A., Vevey, Switzerland, a corporation of Switzerland
Filed Jan. 28, 1964, Ser. No. 340,730
Claims priority, application Switzerland, Feb. 1, 1963, 1,284/63
2 Claims. (Cl. 198—208)

The present invention relates to a compensating device for the expansion of a conveying system.

It is one object of the present invention to provide a compensating device for the expansion of an endless conveying device for the transportation of parts through an installation comprising at least one oven in which the conveying system is travelling.

In accordance with the present invention, the device is characterized by a rod system comprising an expansion bar located in each oven, this rod system being mounted between a fixed point in the installation and a mobile transmission member of the conveying system, with the purpose of displacing that member in the expansion sense of the conveying system, in order to maintain the accurate timing between the passage of any point of the conveying system in respect of a loading and unloading station for fixed parts, and the motion of the loading and unloading members of the same station.

With this and other objects in view, which will become apparent in the following detailed description, the present invention will be clearly understood in connection with the accompanying drawing, in which:

FIGURE 1 is a vertical section of the device; and

FIG. 2 is a plan view of the installation in which the device according to FIG. 1 is mounted.

Referring now to the drawing, the device designed in accordance with the present invention is used for the compensation of the expansion of an endless conveyor 1 transporting parts, for example metallic tubes for tooth paste, through an arrangement comprising an annealing oven 2 having temperatures at the level of the tubes to be transported ranging from 190 to 550° C., a lacquering station 3 and one polymerization oven 4 having temperatures at the level of the tubes to be transported ranging from 150 to 250° C. This device consists of a rod system comprising an expansion bar 5 mounted within the polymerization oven, having one end connected with a fixed point 6 and the other end with the end of a first pivoting lever 7.

An expansion bar 8 is mounted within the annealing oven 2, with one end connected with a transmission pulley 9 of the conveying system 1. This transmission pulley 9 is displaced in the expansion sense of the conveying system, upon increasing the temperature in the annealing oven 2, as it will be described below; the other end of the bar 8 being connected with the end of a second pivoting lever 10. A rod 11 connects both the free ends of the pivoting levers 7 and 10.

The endless conveying system 1, disclosed in FIG. 2 is of the type disclosed in the co-pending patent application, Serial No. 326,500, filed November 27, 1963, of the same inventor. The conveying system 1 moves in the direction of the arrow A and is moved, either continuously or intermittently, by a conventional driving mechanism 12, seizing the chain from beneath before emerging from the lacquering station 3.

A sector or link 13 of the chain 1 passes in front of a fixed loading and unloading station 14 in order to receive the parts to be handled in the installation and to remove the parts therefrom. The chain 1 passes then into the annealing oven 2 and in the latter over the pulley 9, and therefrom into the lacquering station 3. After the lacquering process is terminated in the lacquering station 3, the parts are carried by the chain 1 into the polymerization oven 4, moving over a straining drum 15 provided with a mobile shaft, and then over the transmission pulleys 16 and 17, which are provided with fixed shafts. After emerging from the polymerization oven 4, the link 13 passes again in front of the fixed station 14 for the discharge of the parts handled in the device.

The operation of the compensating device is performed in the following manner:

The expansion of the bar 5 located in the polymerization oven 4 causes the rods 11 and 8 to be displaced by means of the pivoting levers 7 and 10, in the direction of the arrows (FIG. 1); this displacement is still increased upon expansion of the bar 8 located in the annealing oven 2. The transmission pulley 9 is then displaced thus in the direction of expansion of the conveying chain, in order to maintain the accurate timing between the passage of any point of the conveying system in respect to the fixed station 14 and the motion of the loading and unloading members of the same station. Therefore, the location of the link 13, carrying the parts to be handled and the parts already handled, is automatically corrected, so that this link always coincides with the front of the station 14.

While I have disclosed one embodiment of the present invention, it is to be understood that this embodiment is given by example only and not in a limiting sense, the scope of the present invention being determined by the objects and the claims.

I claim:
1. A compensating device for the expansion of an endless conveying system of parts, comprising
   a base,
   a conveying system movably mounted on said base,
   a rod system comprising at least one expansion bar adapted to be located in a heating oven,
   said rod system being mounted on said base between a fixed point and a movable transmission member of said conveying system, in order to displace the said member in the direction of expansion of said conveying system for the purpose of maintaining the accurate timing between the passage of any point of said conveying system in respect to a fixed loading and unloading station of said parts, and the motion of the loading and unloading members of said last mentioned station.
2. The device, as set forth in claim 1, wherein
   said rod system comprises a first expansion bar,
   a first pivoting lever pivotally mounted on said base,
   a connecting rod,
   a second pivoting lever pivotally mounted on said base,
   a second expansion bar,
   said first expansion bar is adapted to be mounted in a polymerization oven and having one end connected with said fixed point and its other end is connected with one end of said first pivoting lever, the other end of said first pivoting lever is connected with one end of said connecting rod, the other end of said connecting rod is connected with one end of said second pivoting lever, the other end of said second pivoting lever is connected with one end of said second expansion bar, said conveying system including a pulley connected with the other end of said second expansion bar, so that upon expansion of at least one of said expansion bars, said pulley will be displaced.

References Cited by the Examiner

UNITED STATES PATENTS 3,054,499  9/62  Petix _____ 198—208

SAMUEL F. COLEMAN, *Primary Examiner.*